US007831801B1

(12) United States Patent  (10) Patent No.: US 7,831,801 B1
Anderson  (45) Date of Patent: Nov. 9, 2010

(54) DIRECT MEMORY ACCESS-BASED MULTI-PROCESSOR ARRAY

(75) Inventor: James Bryan Anderson, Santa Cruz, CA (US)

(73) Assignee: Xilinx, Inc., San Jose, CA (US)

(*) Notice: Subject to any disclaimer, the term of this patent is extended or adjusted under 35 U.S.C. 154(b) by 218 days.

(21) Appl. No.: 11/513,575

(22) Filed: Aug. 30, 2006

(51) Int. Cl.
  *G06F 15/76* (2006.01)
(52) U.S. Cl. ............................................. 712/11
(58) Field of Classification Search ............ 712/10, 712/11
  See application file for complete search history.

(56) References Cited

U.S. PATENT DOCUMENTS

| | | | | |
|---|---|---|---|---|
| 5,375,089 A | * | 12/1994 | Lo | 365/189.04 |
| 5,535,406 A | * | 7/1996 | Kolchinsky | 712/10 |
| 5,832,215 A | * | 11/1998 | Kato et al. | 709/230 |
| 5,870,625 A | * | 2/1999 | Chan et al. | 710/5 |
| 6,067,609 A | * | 5/2000 | Meeker et al. | 712/11 |
| 6,108,755 A | * | 8/2000 | Kabemoto et al. | 711/147 |
| 6,252,818 B1 | * | 6/2001 | Voss | 365/230.05 |
| 6,675,289 B1 | * | 1/2004 | Eslick et al. | 712/226 |
| 6,898,657 B2 | * | 5/2005 | Smith | 710/305 |
| 7,062,587 B2 | * | 6/2006 | Zaidi et al. | 710/305 |
| 7,302,503 B2 | * | 11/2007 | MacInnis | 710/22 |
| 7,421,529 B2 | * | 9/2008 | Speier et al. | 710/200 |

OTHER PUBLICATIONS

Xilinx, Inc.; U.S. Appl. No. 11/513,575 by Anderson on Aug. 30, 2006.
Xilinx, Inc.; "OPB External Memory Controller (OPB EMC) (2.00a)"; DS421; Product Specification; Jan. 16, 2006; available from www.xilinx.com; pp. 1-34.
Xilinx, Inc.; "Block RAM (BRAM) Block (v1.00a)"; DS444; Product Specification; Aug. 13, 2004; available from www.xilinx.com; pp. 1-5.
Alan R. Weiss; "Dhrystone Benchmark: History, Analysis, "Scores" and Recommendations"; White Paper; Oct. 1, 2002; pp. 1-14.
Xilinx, Inc.; "MicroBlaze Performance"; Aug. 15, 2006; downloaded from http://www.xilinx.com/ipcenter/processor_central/microblaze/performance.htm/; pp. 1-2.
Philips Inc., *An Introduction to Very-Long Word (VLIW) Computer Architecture*, Publ. No. 9397-750-01759, Aug. 6, 1997, pp. 1-11.

* cited by examiner

*Primary Examiner*—Jacob Petranek
(74) *Attorney, Agent, or Firm*—W. Eric Webostad; John J. King; Thomas George

(57) ABSTRACT

A direct memory access ("DMA")-based multi-processor array architecture that may be implemented in a single integrated circuit is described. The integrated circuit includes a plurality of processing units. A first processing unit and a second processing unit of the plurality of processing units are topologically coupled via a first DMA block. The first DMA block includes a first dual-ported random access memory and a first decoder. A multiple-processor array is provided by topologically coupling the first processing unit and the second processing unit via the first direct memory access block.

20 Claims, 8 Drawing Sheets

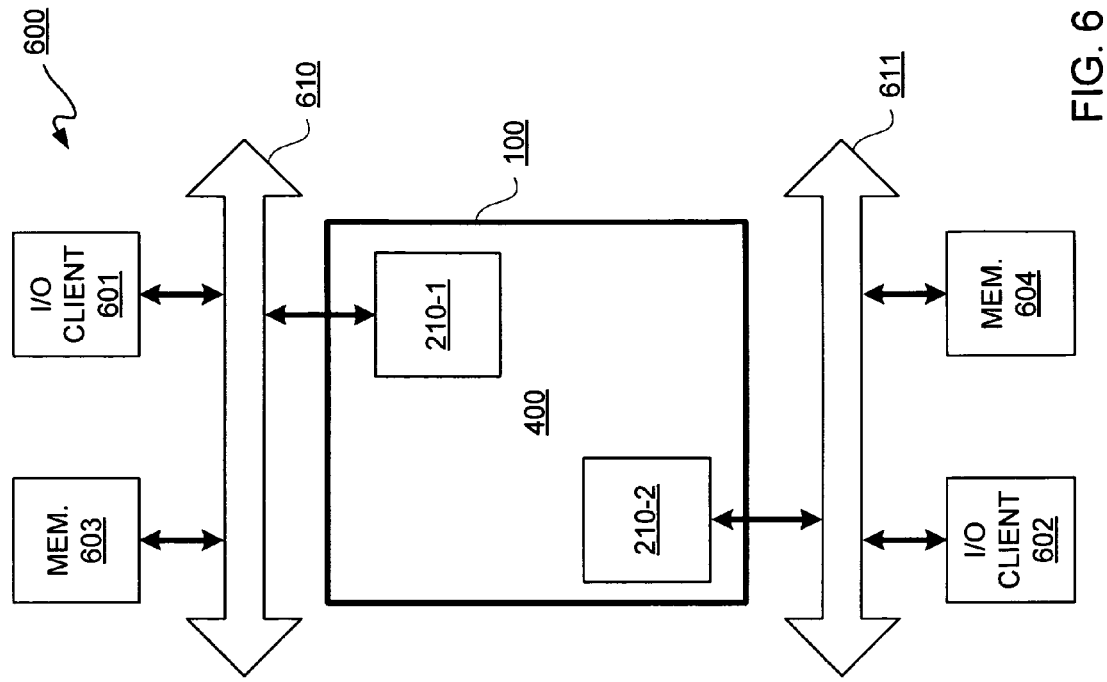
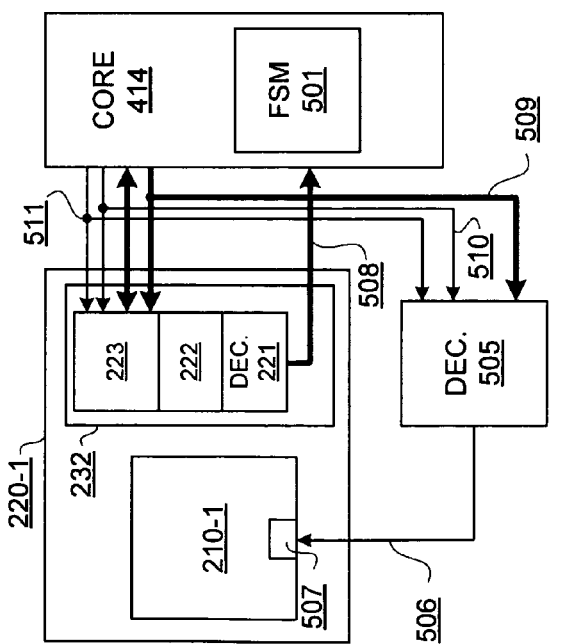
FIG. 5
FIG. 6

US 7,831,801 B1

DIRECT MEMORY ACCESS-BASED MULTI-PROCESSOR ARRAY

FIELD OF THE INVENTION

One or more aspects of the invention relate generally to integrated circuits and, more particularly, to a direct memory access ("DMA")-based multi-processor array architecture that may be implemented in a single integrated circuit.

BACKGROUND OF THE INVENTION

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. Notably, as used herein, "include" and "including" mean including without limitation.

One such FPGA is the Xilinx Virtex® FPGA available from Xilinx, Inc., 2100 Logic Drive, San Jose, Calif. 95124. Another type of PLD is the Complex Programmable Logic Device ("CPLD"). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. Other PLDs are programmed by applying a processing layer, such as a metal layer, that programmably interconnects the various elements on the device. These PLDs are known as mask programmable devices. PLDs can also be implemented in other ways, for example, using fuse or antifuse technology. The terms "PLD" and "programmable logic device" include but are not limited to these exemplary devices, as well as encompassing devices that are only partially programmable.

For purposes of clarity, FPGAs are described below though other types of PLDs may be used. FPGAs may include one or more embedded microprocessors. For example, a microprocessor may be located in an area reserved for it, generally referred to as a "processor block." Additionally or alternatively, microprocessors may be implemented in programmable logic of an FPGA ("FPGA fabric"). These microprocessors are generally referred to as "soft processors" in contrast to embedded microprocessors which are generally referred to as "hard processors." Whether hard or soft, microprocessors may be any of a variety of known architectures, including a reduced instruction set computer ("RISC"), a complex instruction set computer ("CISC"), or a Zero Instruction Set Computer ("ZISC") form.

Architectures associated with multi-processor array ("MPA") configurations have been based on a variety of infrastructures for communication between microprocessors. For example, in some architectures, a networking model is used for a Network-on-Chip ("NoC"). In other architectures, a hierarchical bus model is used for a System-on-Chip ("SoC"). Furthermore, in other architectures, a data streaming via buffering model with first-in-first-out buffers ("FIFOs") is used for an MPA implemented in an FPGA.

In a bus-based SoC implementation, the convenience of abstracting away notions of clock signals, hardware-level concurrency, and pipelining, among other circuit-based factors, with the transaction-level abstraction provided via an Application Programming Interface ("API") comes at a price. With bus-based communication, well-known performance degradation is exhibited as the number of clients is increased. This degradation in performance is rooted in a combination of bandwidth sharing and arbitration-induced losses.

With respect to a streaming data approach, microprocessors implemented in an FPGA communicate using directly connected FIFOs. Access to information in such FIFOs is not random, and this may severely constrain performance in applications involving random access to such information. Moreover, an intimate working knowledge of circuitry issues, such as timing constraints, pipelining, and number of clock cycles, among other known circuitry issues, may be involved in parallel programming for such MPAs.

FPGA-based NoC architectures have been proposed to overcome degradation due to an increase in the number of clients owing to the relative ease with which multiple concurrent connections are supported in such NoC architecture. However, due to the distributed nature of NoC arbitration and routing mechanisms, NoC remains significantly more complex. Furthermore, in its serial form, an NoC may have bandwidth limitations due to serial-to-parallel datapath conversion overhead. This additional overhead also increases complexity. Moreover, a parallel form of NoC suffers from scalability limitations as network infrastructure is by nature highly consumptive of routing resources.

Additionally, for FPGA-based bus or network infrastructures, there exist additional problems of synthesizing and mapping a hardware description language ("HDL") representation to structures that are resource-efficient. Moreover, this inefficiency, in addition to being based upon resource utilization, may further be based upon inefficiencies associated with pipeline latency and overall speed.

Accordingly, it would be both desirable and useful to provide an MPA architecture that is at least less susceptible to one or more of the above-identified limitations.

SUMMARY OF THE INVENTION

One or more aspects of the invention generally relate to integrated circuits and, more particularly, to a direct memory access ("DMA")-based multi-processor array architecture that may be implemented in a single integrated circuit.

An aspect of the invention provides an integrated circuit including a plurality of processing units. A first processing unit and a second processing unit of the plurality of processing units are topologically coupled via a first direct memory access block. The first direct memory access block includes a first dual-ported random access memory and a first decoder. A multiple-processor array is provided.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

FIG. 5 is a block diagram depicting an exemplary embodiment of a core coupled to a processor module of the MPA of FIGS. 3 and 4.

FIG. 6 is a block diagram depicting an exemplary embodiment of a computer system which includes the MPA SoC of FIG. 4.

DETAILED DESCRIPTION OF THE DRAWINGS

Figure 1:
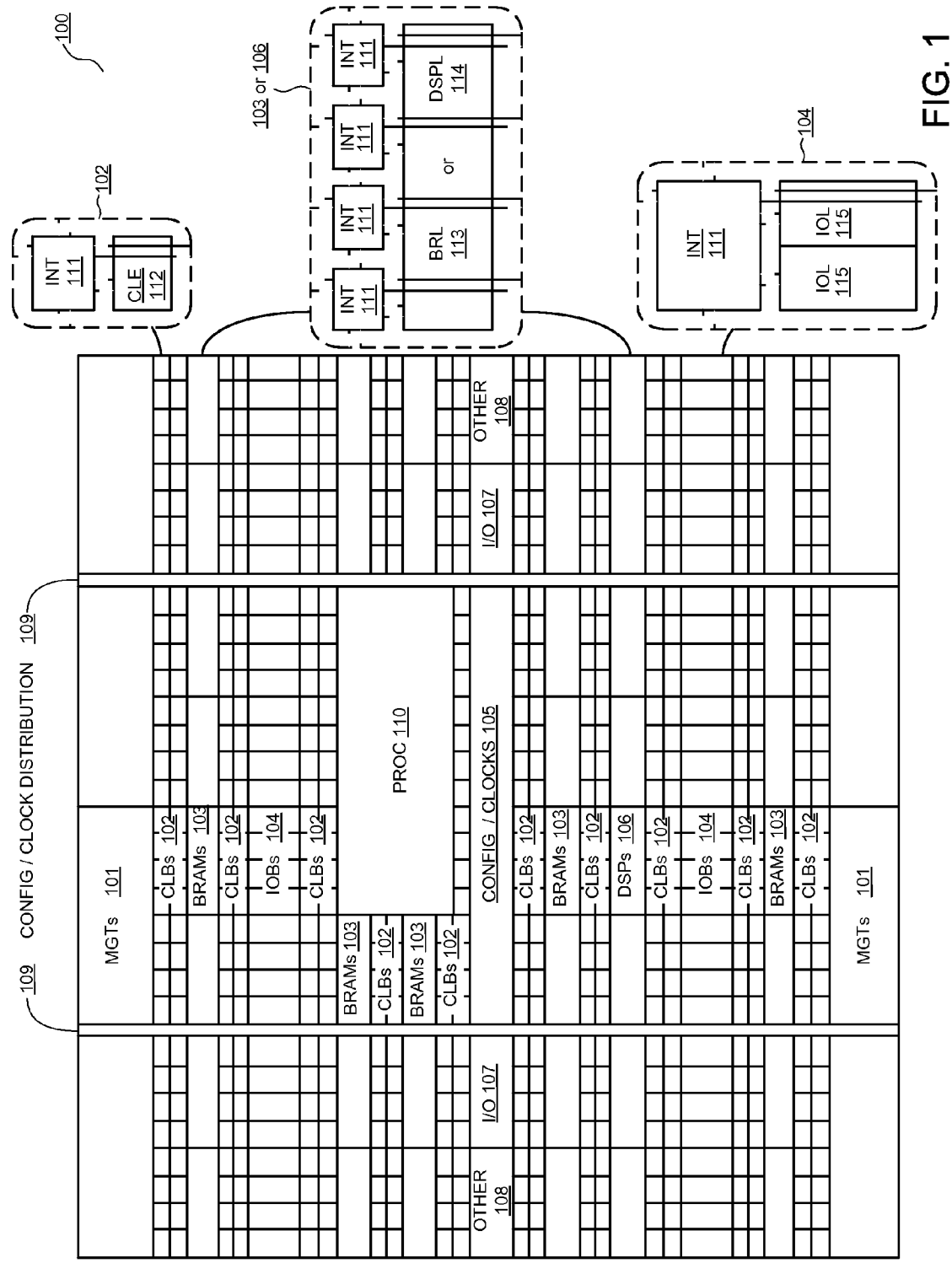
FIG. 1 is a simplified block diagram depicting an exemplary embodiment of a columnar Field Programmable Gate Array ("FPGA") architecture in which one or more aspects of the invention may be implemented.

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Below, a DMA-based MPA architecture is described. While this DMA-based MPA is described for an example implementation in an FPGA, it should be appreciated that other forms of implementation may be used. For example, an Application Specific Integrated Circuit ("ASIC") may be used, or a hybrid integrated circuit having both programmable logic and dedicated logic may be used. Thus, generally, it should be appreciated that a DMA-based MPA architecture as described herein may be implemented in a single microchip ("chip").

In the following description, MPA inter-processor communication is described as being implemented using "micro-DMAs." The micro-DMAs provide topological interconnects between processors. Thus, an MPA employs a set of bilateral micro-DMA instances. Notably, as shall be appreciated from the following description, this MPA topology is scalable, and thus is not limited to the particular processor array sizes described in the examples that follow.

From the following description, it should be appreciated that parallel processor performance dynamics of a micro-DMA-based MPA may be achieved over essentially any number of microprocessors that may be implemented in a single chip. This is because the number of microprocessors may be increased without correspondingly having much more complex arbitration as between such microprocessors.

As shall be appreciated from the following description, the use of micro-DMA instances does not need to involve arbitration at the DMA buffer level. In particular, dual-ported random access memory ("RAM") resources may be used to avoid such arbitration. Thus, DMA buffer access is made more independent of scale or topological connectivity, as there is little to no concomitant complexity from arbitration as between microprocessors for access to shared memory. Moreover, access to memory may be random, in contrast to an MPA with a FIFO interconnect topology.

By providing support for micro-DMA control mechanisms for each DMA buffer instance, a highly repeatable constructive principle for hybrid processing structures is provided. Thus, although the following description is in terms of an FPGA-centric implementation using MPA arrays of RISC microprocessors, it should be appreciated that a heterogeneous mix of microprocessors may be used. Such heterogeneous mix may include RISC processors, digital signal processing ("DSP") processors, application-specific processors, cyclostatic structures, finite state machines ("FSMs"), or CISC processors, among other known types of processor structures.

In the following FPGA-based MPA implementations, RISC soft processors implemented in programmable logic are inter-connected with micro-DMA instances. These soft processors for example may be MicroBlaze soft processors. Notably, although RISC soft processors are described, it should be appreciated that RISC hard processors, or a combination of hard and soft processors may be used. Furthermore, it should be appreciated that the number of micro-DMA instances used for such inter-connection is generally dependent upon desired performance characteristics and available programmable logic resources ("FPGA fabric").

In the following description, microprocessor interconnection is based upon micro-DMA instances using dual-ported BRAM using BRAM interconnect. Additionally, there is associated control logic for such interconnect. Furthermore, micro-DMA instances may interface with cores, namely micro-DMA instances may be used to couple optional cores instantiated in programmable logic to an MPA implementations. It should be appreciated that such optional cores may form a basis for providing instruction or other form of control to an MPA or may be accelerators such as co-processors, or a combination thereof.

Processor-to-processor, as well as processor-to-core, communication may be structured as concurrent, memory-mapped buffered exchanges via topological micro-DMA instances. Thus, it should be appreciated that performance limitations associated with NoC and SoC interconnects, as described above with respect to other MPA architectures, may be substantially avoided.

It should further be appreciated that the DMA-based MPA architecture described herein may be used as a processing resource for creation of useful SoC, FPGA-as-Processor ("FPGAaP"), and Super-Computer-on-Chip ("SCoC") structures. Furthermore, the DMA-based MPA architecture, as described herein, for such SoC, FPGAaP, and SCoC applications may involve little to no change in known software tools and parallel programming software models.

FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output ports ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element 111 in each adjacent tile. Therefore, the programmable interconnect elements 111 taken together implement the programmable interconnect structure for the illustrated FPGA. Each programmable interconnect element 111 also includes the connections to and from any other programmable logic element(s) within the same tile, as shown by the examples included at the right side of FIG. 1.

For example, a CLB 102 can include a configurable logic element ("CLE") 112 that can be programmed to implement user logic plus a single programmable interconnect element 111. A BRAM 103 can include a BRAM logic element ("BRL") 113 in addition to one or more programmable interconnect elements 111. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element ("DSPL") 114 in addition to an appropriate number of programmable interconnect elements 111. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 are manufactured using metal layered above the various illustrated logic blocks, and typically are not confined to the area of the I/O logic element 115.

In the pictured embodiment, a columnar area near the center of the die (shown shaded in FIG. 1) is used for configuration, I/O, clock, and other control logic. Vertical areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the right side of FIG. 1 are purely exemplary. For example, in an actual FPGA more than one adjacent column of CLBs is typically included wherever the CLBs appear, to facilitate the efficient implementation of user logic. FPGA 100 illustratively represents a columnar architecture, though FPGAs of other architectures, such as ring architectures for example, may be used. FPGA 100 may be a Virtex-4™ FPGA from Xilinx of San Jose, Calif.

Figure 2:
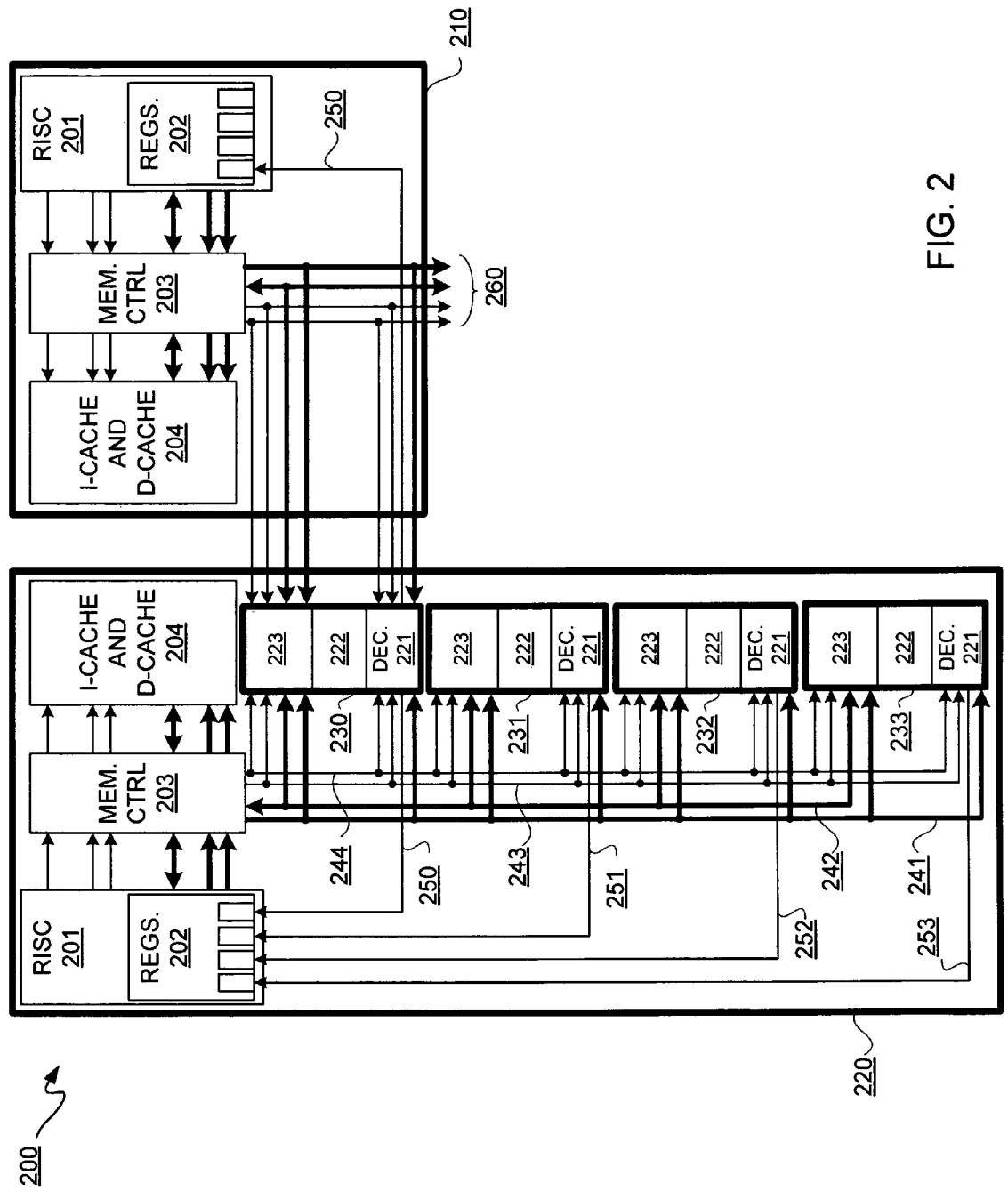
FIG. 2 is a block diagram depicting an exemplary embodiment of a portion of a multi-processor array ("MPA").

FIG. 2 is a block diagram depicting an exemplary embodiment of a portion of an MPA 200. MPA 200 includes at least two processors sharing a micro-DMA block 230. In this example, there are separate instances of RISC processors 201, where each RISC processor includes separate sets of registers 202. Coupled to each RISC processor 201 is a memory controller 203, and coupled to each memory controller 203 is an instruction and data cache 204. In this particular example, a BRAM is used to implement instruction and data cache 204, where one side of the BRAM is used for instruction caching and the other side of the BRAM is used for data caching. However, separate memories may be used for instruction and data cache 204.

Signaling between memory controller 203 and RISC processor 201, as well as instruction and data cache 204, involves a chip select signal, a write enable signal, data signaling, and address signaling. Separate address buses are used for handling instruction and data addresses; however, data for both instruction and data caching may be provided via a common data bus. Moreover, separate write enable signals are used for instruction and data; however, a single chip select signal may be used for both instruction and data caching. As interfaces between memory controller 203, RISC processor 201, and instruction and data cache 204 are known, they are not described in unnecessary detail herein.

Micro-DMA blocks 230 through 233 are coupled to memory controller 203 and to left-side RISC processor 201. Each of micro-DMA blocks 230 through 233 include a buffer addressable space ("area") 223, a status and control data area 222, and a decoder 221. Buffer area 223 and status and control data area 222 of each micro-DMA block 230 through 233 may be separate address spaces of a dual-ported BRAM. Notably, status and control data area 222 may be reserved memory address space, namely reserved for status and control data for synchronizing states between right- and left-side RISC processors 201. Decoder 221, which is described in additional detail below, may be a separate block of circuitry from the BRAM used to provide buffer area 223 and status and control data area 222, and may be implemented in application specific circuitry or programmable logic.

Left-side memory controller 203 is coupled to each of micro-DMA blocks 230 through 233 via signal buses 241 through 244. Right-side memory controller 203 is coupled to micro-DMA block 230 via corresponding counterpart busing. Notably, signals out of and to a memory controller 203 are generally collectively referenced as signals 260. Bus 241 may be an address bus. Bus 242 may be a data bus. Bus 243 may be a write enable bus. Bus 244 may be a chip select bus. Notably, although the term "chip select" is used, it should be appreciated that micro-DMA blocks 230 through 233, as well as memory controller 203 and instruction and data cache 204 may be implemented in a same integrated circuit. Thus, the term "chip select" more generally may be thought of as a block select.

It should be appreciated that each processor is associated with another processor via a shared micro-DMA block, such as shared micro-DMA block 230 in this example. However, each processor has a private instruction and data cache 204. Furthermore, it should be appreciated that micro-DMA blocks are bidirectional, and thus may be coupled to separate processors. If, for example, left-side RISC processor 201 initiates an activity, and thus the primary processor with respect to such activity, a work unit may be placed into micro-DMA block 230, and more particularly into status and control data area 222. This work unit indicates that left-side RISC processor 201 is working on an activity which involves data stored in buffer area 223, and this data may be identified with a particular address range or ranges. Responsive to a work unit being placed into micro-DMA block 230, decoder 221 passes a token to right-side RISC processor 201 via an event signal 250 associated with register space of such right-side RISC processor 201. In other words, this token may be passed to right-side RISC processor 201 via an event or events signal 250, and stored in a register of registers 202 of such right-side RISC processor 201. Notably, in this example, event signals 250 through 253 are respectively provided from decoders 221 of micro-DMA blocks 230 through 233 for individual registers of registers 202 of left-side RISC processor 201, and another event signal 250 is associated with right-side RISC processor 201 for a shared micro-DMA block 230. However, it should be appreciated that other configurations for storing the indicators or flags for one or more events associated with a micro-DMA instance may be used.

Memory controller 203 associated with each RISC processor 201 maps processor instruction and data cache memory 204 and maps micro-DMA memory associated with areas 223 and 222. Notably, memory controller 203 maps such instruction and data into a composite address space. Thus, memory 204 and memories of micro-DMA blocks 230 through 233 may be a composite address space, which may or may not be contiguous, and is mapped by memory controller 203. Thus, it should be appreciated that transactions via micro-DMA blocks may occur as memory reads or writes which simplifies the application program interface.

Activity associated with a micro-DMA block is decoded by an associated decoder 221. More particularly, accesses to status and control data area 222 are decoded by decoder 221. Thus, the processor initiating such activity may be considered the primary or initiating processor, and the processor that shares the micro-DMA block associated with such activity may be considered the secondary or attendant processor with respect to the activity. Additionally, decoder 221 decodes based on activity in buffer area 223. In particular, a read from or write to an address space in buffer area 223 is decoded by decoder 221, and based on such decoded activity, decoder 221 sends an event vector to the processor not initiating the activity.

Thus, it should be appreciated that micro-DMA blocks may include dual-ported BRAM and a conventional or simplified version of a DMA decoder adapted for use as bidirectional, peer-to-peer inter-processor communications resources. Random access, block-oriented transfer and support for a buffer partitioning may be implemented. Thus, DMA buffer areas, such as buffer areas 223, may be instanced such that there is at least one shared DMA buffer area for each processor-to-processor coupling for providing at least approximately full-bandwidth, block-oriented data/control transfer between topologically adjacent processors. Bandwidth sharing in this implementation is cast in a form of RISC processing applied to a set of shared buffers, and arbitration, what little there is, is cast in terms of an associated queue service paradigm.

In scatter-gather processing in an MPA, Locality-of-Reference ("LoR") may be considered. LoR is less of an issue, such as for example DSP, butterfly transform, and other types of closely connected activities. For LoR to an initiating processor, it should be appreciated that one or more attendant processors may be coupled via a shared micro-DMA block. It should be appreciated that using a micro-DMA-based topology for arraying processors, such as in MPA 200 for example, eliminates much of the infrastructure associated with conventional bus and network multi-processor topologies, and thus reduces or eliminates associated performance limitations.

From the following descriptions, it shall be appreciated how the leveraging of parallel processor acceleration and extension of programmable logic abstraction in the form of a parallel-programming model using micro-DMA-based topology as a basis for datapath configuration may be obtained. Along those lines, for purposes of clarity, it shall be assumed that memory controller 203 and instruction and data cache 204 are part of RISC processor 201 including associated busing to form a processor block 210. Furthermore, in addition to the use of a processor block 210, it shall be assumed that processor modules 220 are formed by the inclusion of a processor block 210 as well as least one shared micro-DMA block.

Notably, it should be appreciated that decoder 221 of each micro-DMA block 230 through 233 may be a conventional DMA decoder configured for managing two ports, namely the dual-ported BRAM used to provide buffer area 223 and status and control data area 222. However, conventional DMA decoders have more complexity than is needed for decoder 221, and thus a much more simplified decoder 221 may be implemented. Because a dual-ported BRAM is implemented, decoder 221 may be simple in that it only has to manage the two ports of the dual-ported BRAM.

Notably, left-side RISC processor 201 may perform operations on memory associated with areas 222 and 223 of micro-DMA block 230 without interference from right-side RISC processor 201 and vice versa. Synchronization of state between left- and right-side RISC processors 201 may be used to avoid degenerative conditions, such as a read while writing or a write while reading of the same address space. Such synchronization may be implemented using finite state machines ("FSMs") respectively associated with RISC processors 201. Such an FSM may be implemented as separate circuit coupled to registers 202, such as may be implemented in dedicated or programmable logic. However, for purposes of clarity by way of example and not limitation, it shall be assumed that an FSM is implemented in RISC processor 201, such as a software FSM.

Respective FSMs associated with left-side and right-side RISC processors 201 may be synchronized with each other responsive to the status and control information stored in status and control data area 222. This information, as well as knowledge of what tasks such processors have initiated, may be provided to RISC processors 201 via the combination of event signals. Moreover, it should be appreciated that the addresses associated with memory of micro-DMA block 230, namely buffer area 223 and status and control data area 222, may be mapped to left- and right-side RISC processors 201. Thus, such processors 201 may have access to the same addresses. Alternatively, addresses may be partitioned such that left- and right-side RISC processors 201 have no address overlap or only partial address overlap with respect to address space of buffer area 223. For clarity by way of example and not limitation, it shall be assumed that processors 201 share the same address ranges, as exchange of information may be done without any translation of addresses.

For example, if left-side RISC processor 201 initiates a work unit, an associated instruction, for example, written to buffer area 223 is recorded in status and control data area 222. Decoder 221 issues an event signal 250 which is provided to right-side RISC processor 201 and registered in a register of registers 202 thereof. This information, along with whatever task initiated by left-side RISC processor 201, is used to coordinate access to shared micro-DMA block 230 via FSMs instantiated in software running using left- and right-side RISC processors 201.

Notably, right-side RISC processor 201 may handle the task, which is issued by left-side RISC processor 201, by using shared memory of micro-DMA block 230 as in situ scratch pad memory. Along those lines, it should be appreciated that each memory respectively associated with micro-DMA blocks 230 through 233 may have information for associated secondary processors where left-side RISC processor 201 is a primary processor. Accordingly, information for secondary processes may be distributed for scatter-gather MPA processing. Notably, in the example embodiment of FIG. 2, each RISC processor has a private instruction and data cache 204.

Figure 3:
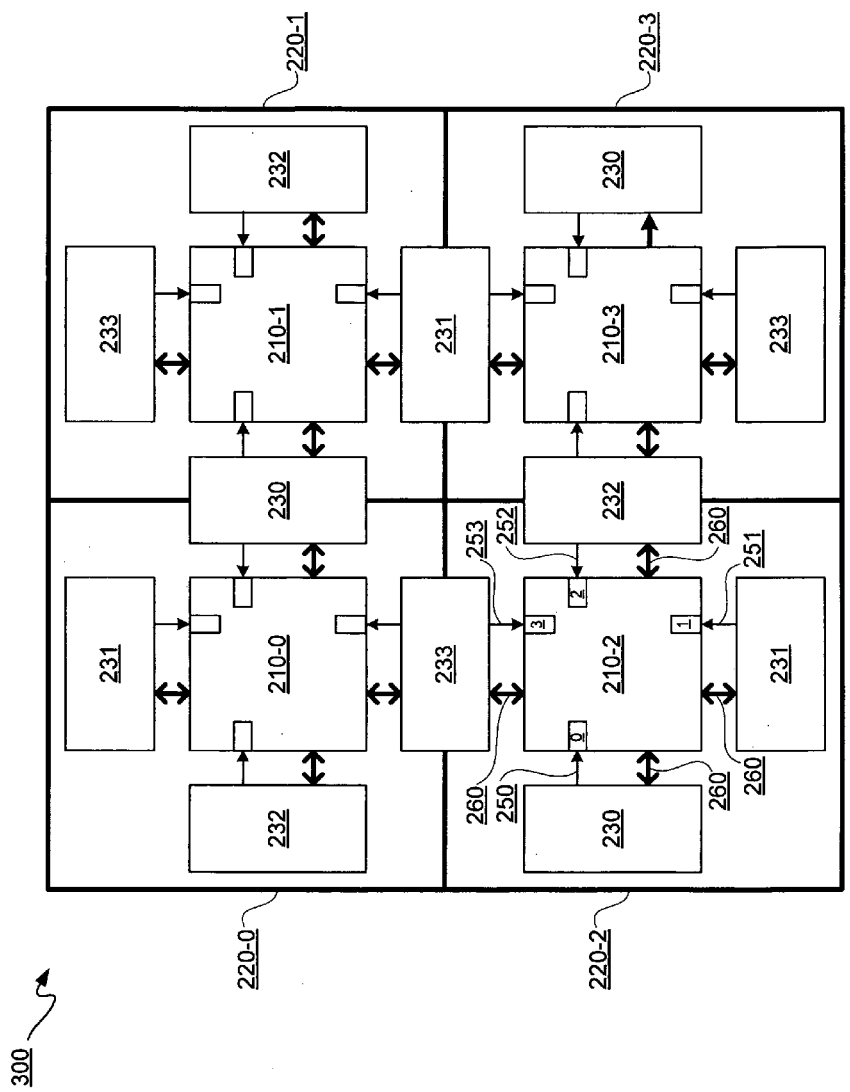
FIG. 3 is a block diagram depicting an exemplary embodiment of an MPA.

FIG. 3 is a block diagram depicting an exemplary embodiment of an MPA 300. MPA 300 may be implemented in an FPGA, such as FPGA 100 of FIG. 1. Continuing the example of soft core RISC processors, processor blocks 210-0 through 210-3 are implemented in programmable logic of an FPGA. Coupling processor block 210-0 to block 210-1 is a shared micro-DMA block 230. Coupling processor blocks 210-0 and block 210-2 is a shared micro-DMA block 233. Notably, these two micro-DMA blocks 230 and 233, together with micro-DMA blocks 231 and 232 and processor block 210, are part of a processor module 220-0. Accordingly, processor modules 220-0 through 220-3 may be tiled to provide MPA 300 where shared micro-DMA blocks interconnect processor blocks. In this example, processor blocks 210-2 and 210-3 are coupled via shared micro-DMA block 232, and processor blocks 210-1 and 210-3 are coupled via a shared micro-DMA block 231.

With simultaneous reference to FIGS. 2 and 3, MPA 300 is further described. As noted above, signals out of and to a memory controller 203 are collectively referenced as signals 260. Signals 260 are used to couple in this example four micro-DMA blocks for each processor block of processor blocks 210-0 through 210-3, and thus common busing may be used within each processor module. Event signals 250 through 253 of a processor module are shown as going to respective registers or register banks of registers 202 of each processor block. In some instances, a micro-DMA block, as described above, is shared as between processor blocks.

Although an alternating pattern of micro-DMA blocks is shown, such as a row of alternating micro-DMA blocks 231 and 233, followed by a subsequent row of such alternating blocks though with the inverse order, rows of same micro-DMA blocks may be used. For example, a row of micro-DMA blocks 231 may be followed by a row of micro-DMA blocks 233, which is then followed by another row of micro-DMA blocks 231, and so on. Likewise, the same may be said with respect to columns of micro-DMA blocks 230 and 232. It should be appreciated that the relative position of a micro-DMA block with respect to a processor block of a processor module may be relevant to addressing. For example, if the micro-DMA blocks 230 through 233 were associated with relative address positions 0 through 3, respectively, then four sets of register of registers 202 may have an association with addresses 0 through 3, respectively. Thus, mapping of addresses between processors and micro-DMA blocks may be simplified to avoid address translation. Moreover, as addresses may follow the relative position of micro-DMA blocks, associated event signals may likewise correspond to particular registers, as indicated by signals 250 through 253 respectively provided to registers 0 through 3 of registers 202 of processor block 210-2.

The two-dimensional mesh architecture of MPA 300, or any other two-dimensional MPA architecture as described herein, may be used where addresses correspond to relative position of micro-DMA blocks. However, to avoid cross-connecting processor modules, some address translation may be implemented, as described in additional detail with reference to FIG. 9.

With continuing reference to FIGS. 2 and 3, dual-port BRAM instances for micro-DMA blocks 230 through 233 are illustratively shown as a by-four ("×4") configuration with respect to a RISC processor 201. However, it should be appreciated that more or less than four micro-DMA blocks may be implemented per processor, and thus a processor may have as few as one micro-DMA block associated with it for sharing with another processor. Notably, even though an ×4 representation is described, it should be appreciated that some of such micro-DMA blocks may be shared peer-to-peer connections for processor-to-processor coupling.

With continuing reference to FIG. 3, it should be appreciated that a two-by-two micro-DMA MPA 300 is illustratively shown in the form of a two-dimensional mesh architecture. By having consistent infrastructure topology for each micro-DMA block, architectural integrity is facilitated. Moreover, with an ordering, such as from 0 to 3, of micro-DMA blocks, BRAM address partitions of associated coupled processors may match each other. Thus, processor-to-processor communication may employ the same memory addresses in an associated micro-DMA buffer used to couple such processors. However, this is not a requirement of the MPA architecture. Rather, memory addresses of the MPA architecture described herein more generally are isomorphically mapped. Accordingly, passing of addresses may involve address translation, namely an offset addressing.

Figure 4:
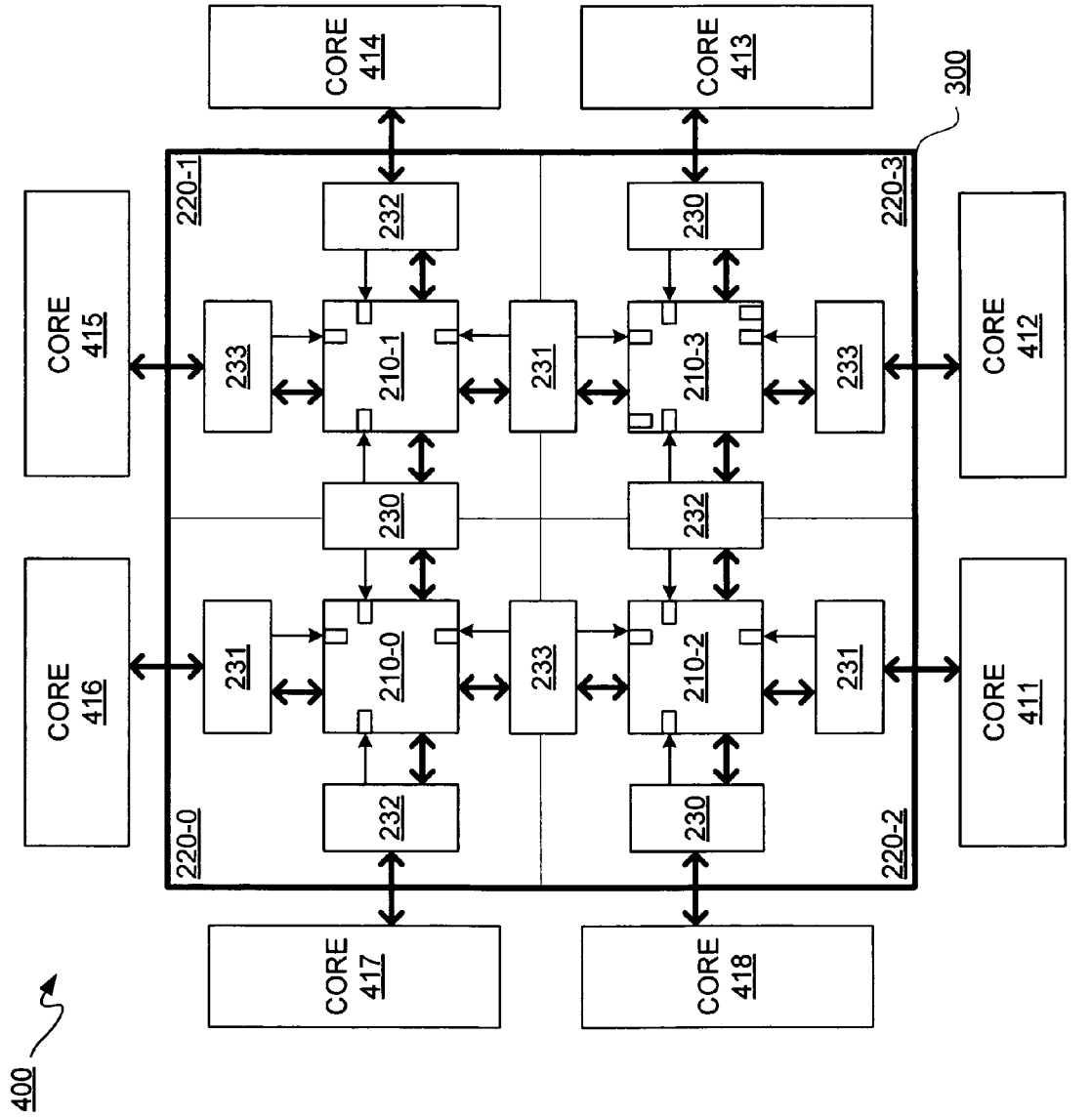
FIG. 4 is a block diagram depicting an exemplary embodiment of an MPA System-on-Chip ("SoC") that includes the MPA of FIG. 3.

FIG. 4 is a block diagram depicting an exemplary embodiment of an MPA SoC 400. MPA SoC 400 may be implemented in an FPGA, such as FPGA 100 of FIG. 1, for example. MPA SoC 400 includes MPA 300 of FIG. 3, as well as cores 411 through 418. Cores 411 through 418 may be respective implementations of circuits which may be coupled to MPA 300. Notably, cores 411 through 418 may be implemented in programmable logic, application specific logic, or a combination thereof.

Cores 411 through 418 are external circuits with respect to MPA 300. However, it should be appreciated that the same busing architecture associated with signals 260 may generally be used for communicating between micro-DMA blocks and MPA external cores. Cores 411 through 418 communicate with MPA 300 via respective peripheral micro-DMAs. For example, peripheral micro-DMAs blocks 230 and 231 of processor module 220-2 are respectively coupled to cores 418 and 411. Micro-DMA blocks 230 and 233 of processor module 220-3 are respectively coupled to cores 413 and 412. Cores 414 and 415 are respectively coupled to micro-DMA blocks 232 and 233 of processor module 220-1, and cores 416 and 417 are respectively coupled to micro-DMA blocks 231 and 232 of processor module 220-0. Accordingly, devices external to MPA 300 may be coupled using micro-DMA blocks.

Instancing of micro-DMAs on a per-connection basis, whether processor-to-processor or processor-to-MPA external device, facilitates buffer exchange concurrency. This may result in generally high performance relative to minimal implementation cost. An MPA architecture as described herein is a parallel processor architecture, and thus associated performance enhancements remain available within the context of applications developed for such parallel processing. Furthermore, it should be appreciated that an MPA architecture as described herein may be used for a parallel program software representation. In other words, the representational flexibility of an MPA as described herein may facilitate transfer of a datapath previously reserved to specialized hardware logic to software owing to the high performance capability of such an MPA. Additionally, as interconnectivity may be generally described as reads and writes to random access memory, a detailed knowledge of HDL implementation may be reduced or avoided, which facilitates using software, such as C++, Java, and the like, having less hardware dependence.

Furthermore, it should be appreciated that an MPA as described herein with micro-DMA instances may be implemented with hard or soft microprocessors. Accordingly, such a micro-DMA-based MPA architecture may be leveraged as a building block for creation of extended datapath processing structures, including being extended to peripheral cores as described with reference to FIG. 4, or other devices, such as for example FPGA external I/O clients and memory, among other types of FPGA external devices. Furthermore, traditional bus/network infrastructure may be appended to micro-DMA MPA for connection of such FPGA external devices. Thus, an MPA may be leveraged to extend to or be part of an SoC or NoC architecture, where an MPA with micro-DMA connectivity is used.

As indicated below in additional detail, a micro-DMA-based MPA architecture may be extended to an FPGA in the form of a configurable high-performance processor, namely such as an FPGAaP or an SCoC. Furthermore, by reducing inter-processor communication as a system-theoretic performance limit, it should be appreciated that performance of a micro-DMA-based MPA architecture becomes more dependent upon microprocessor performance, as well as performance of associated micro-DMA instances. In other words, performance is more directly coupled to the performance of the microprocessor, and reads and writes to random access memory associated therewith.

FIG. 5 is a block diagram depicting an exemplary embodiment of core 414 of FIG. 4 coupled to processor module 220-1 of FIGS. 3 and 4. More particularly, chip select signal 511 is provided from core 414 to memory associated with buffer area 223. Furthermore, a write enable signal 510 is provided from core 414 to memory associated with area 223. Additionally, chip select signal 511 and write enable signal 510 are provided to another decoder, namely decoder 505. Lastly, an address signal 509 is provided from core 414 to memory associated with area 223 and to decoder 505. Decoder 505 provides event signal 506 indicating one or more events to processor block 210-1 and, more particularly, to register file 507 of processor block 210-1. Notably, coupling between processor block 210-1 and micro-DMA block 232 is not shown for purposes of clarity, but follows from the above description. Additionally, core 414 may include an FSM 501 for synchronization with an FSM associated with RISC processor of processor block 210-1. Thus, decoder 221 may provide status and control data 508 to core 414 for maintaining FSM 501.

With renewed reference to FIG. 4, cores 411 through 418 in combination with MPA 300 may be used to provide a bank of multiply-accumulate units. Furthermore, although a core is shown coupled to each peripheral micro-DMA, there may be a reduction in the number of such cores, and correspondingly, a reduction in the number of micro-DMAs associated with such cores. Implementation of a bank of multiply-accumulate units is merely one example of how MPA 300 may be applied. Accordingly, it should be appreciated that any other known uses of microprocessors where high performance is desirable are likewise suitable applications for MPA 300.

FIG. 6 is a block diagram depicting an exemplary embodiment of a computer system 600, including MPA SoC 400. Notably, MPA SoC 400 is implemented in this example in a single integrated circuit, such as FPGA 100 of FIG. 1. Processor block 210-1 is coupled to an FPGA external bus 610, and processor block 210-2 is coupled to an FPGA external bus 611. Notably, for computer system 600, MPA SoC 400 is fed on two sides for higher performance. It should be appreciated that MPA SoC 400 may be fed on fewer or more than two sides depending on performance criteria.

If one or both of buses 610 and 611 were an FPGA internal bus, such bus or buses may be mapped directly to a processor block of MPA SoC 400 as previously described with reference to use of micro-DMA blocks. However, for external busing, it should be appreciated that such external buses generally may be coupled to a conventional bus hierarchy, as is known.

One or more different types of devices, or one or more same types of devices, may be coupled to external buses, such as buses 610 and 611. In this example, I/O clients 601 and 602 are respectively shown coupled to external buses 610 and 611. Furthermore, in this example, external memories 603 and 604, which may be for example DRAM or FLASH memories, are illustratively shown coupled to external buses 610 and 611 respectively. Alternatively, one or both of memories 603 and 604 may be another type of memory, such as SRAM or other known type memory. Thus, it should be appreciated that a micro-DMA-based MPA may form part of a larger architecture.

Figure 7:
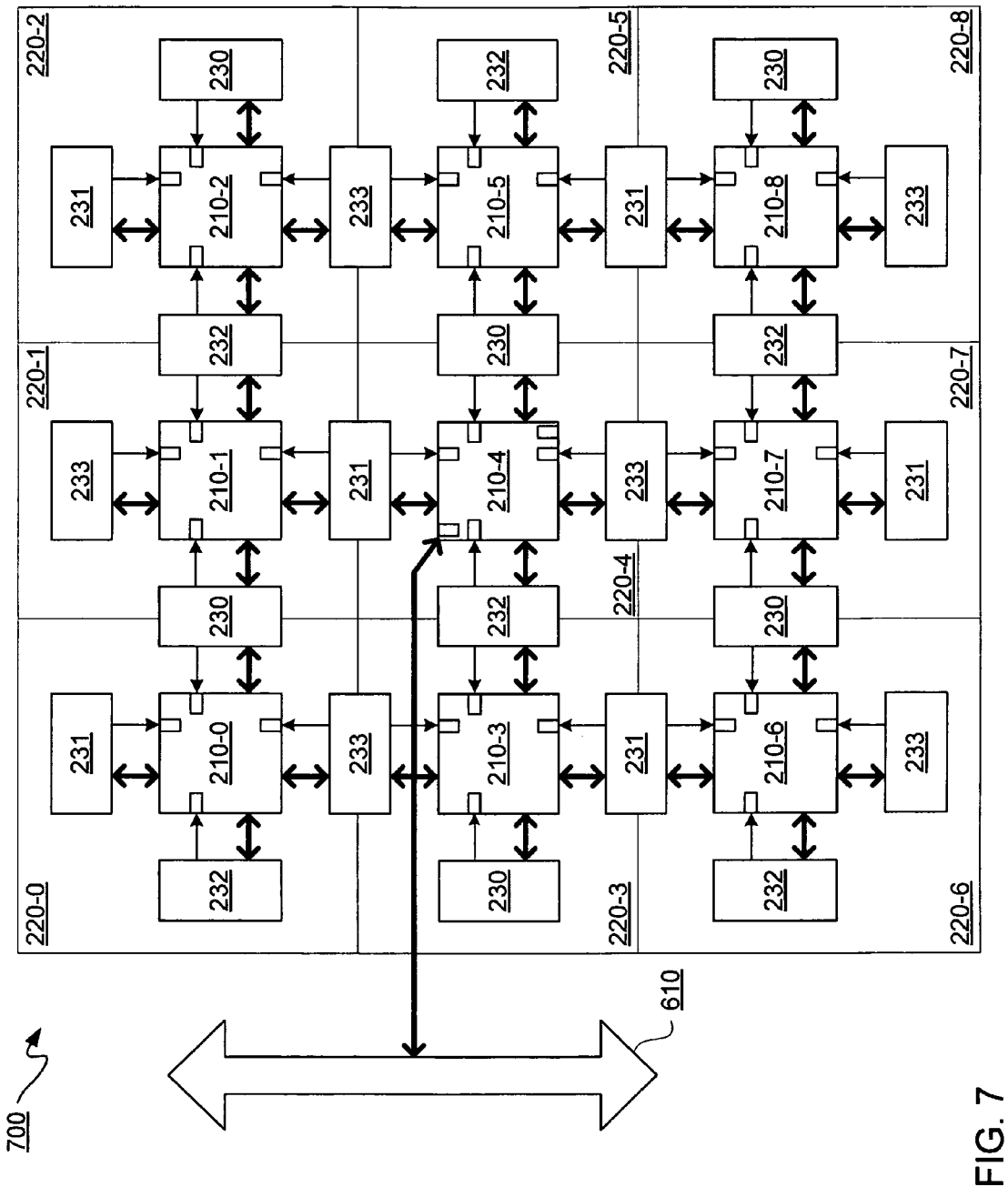
FIG. 7 is a block diagram depicting an exemplary embodiment of a three-by-three micro-DMA-based MPA coupled to an external bus.

FIG. 7 is a block diagram depicting an exemplary embodiment of a three-by-three micro-DMA-based MPA 700 coupled to external bus 610. MPA 700 includes processor modules 220-0 through 220-8 tiled in a three-by-three array. Respectively within processor modules 220-0 through 220-8 are processor blocks 210-0 through 210-8. In this arrangement, a central microprocessor of processor block 210-4 may act primarily as a scatter-gather processor/server for the remaining eight processors associated with the remaining processor blocks. Thus, processor block 210-4 may be coupled to one or more external buses, such as external bus 610, as a location of communication between MPA 700 and devices external to an FPGA in which MPA 700 is implemented. Processor block 210-4 may include one or more additional registers for communication with devices external to MPA 700, as generally indicated by additional blocks within processor block 210-4.

Figure 8:
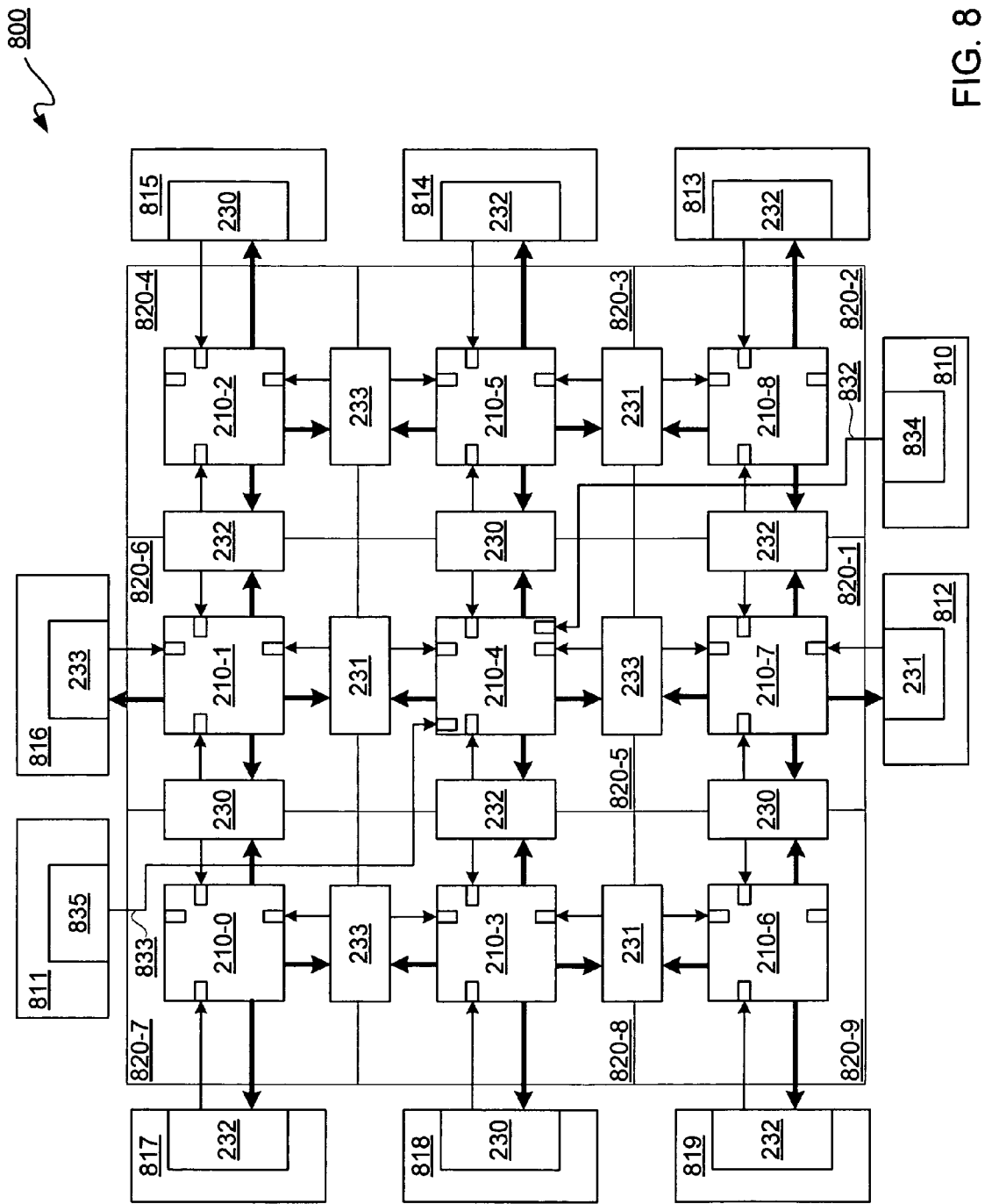
FIG. 8 is a block diagram depicting an exemplary embodiment of an FPGA-as-Processor ("FPGAaP") which includes a three-by-three micro-DMA-based MPA.

FIG. 8 is a block diagram depicting an exemplary embodiment of an FPGAaP 800. FPGAaP 800 includes MPA 700 of FIG. 7, except peripheral micro-DMA blocks of MPA 700 have been incorporated into cores respectively associated therewith. In FPGAaP 800, cores 812 through 819 incorporate micro-DMA blocks associated with respective processor modules thereof, namely processor modules 820-1 through 820-4 and 820-6 through 820-9. Additionally, memory 811 and I/O device 810 respectively incorporate micro-DMA blocks 835 and 834 for communication with processor block 210-4. Notably, busing associated with signals 260 are not shown for purposes of clarity going from processor block 210-4 to micro-DMA blocks 835 and 834; however, event signals 832 and 833 from micro-DMA blocks 834 and 835, respectively, to respective registers of processor block 210-4 are illustratively shown. In this example, central processor block 210-4 has additional registers of registers 202 of FIG. 2 for communicating with micro-DMA blocks 834 and 835 with reference to event signals 832 and 833, respectively. Notably, although a central processor block is used as a location of communication between an MPA and devices external thereto, the selected processor block need not be central to the MPA in which it is implemented.

Accordingly, it should be appreciated that micro-DMA instances may be used as substantially ubiquitous building blocks for an MPA architecture. In this particular example, I/O device 810 may be an interface to external I/O devices, and I/O device 810 may be external to or internal to FPGAaP 800. Moreover, memory 811 may be internal to or external to FPGAaP 800.

A task may be provided to central processor block 210-4, and data for such task may be obtained from memory 811. The task may be issued from a device external to an FPGA associated with FPGAaP 800 or may be a built-in software application, or any combination thereof. The task may be broken out or scattered among the processor blocks forming the periphery around central processor block 210-4, namely processor blocks 210-0 through 210-3 and 210-5 through 210-8.

In the scatter-gather model, the peripheral processors can obtain partial results which are gathered by the central processor block 210-4 for providing a final result. It should further be appreciated that data associated with each of the peripheral processors may be provided via micro-DMAs coupled between central processor block 210-4 and horizontally or vertically neighboring processor blocks. For diagonally neighboring processor blocks in this architecture, such data may be passed through a processor block to another processor block, such as processor blocks 210-0, 210-2, 210-6, and 210-8, for such peripheral processing. Accordingly, the reverse direction of flow back to central processor block 210-4 may also be via an interim processor block.

By having a central processor block 210-4 act as a server processor for scatter-gather as architected, there is little to no contention for memory access. The peripheral processors may enlist associated cores for completion of a partial result. The partial results provided back to the central processor block 210-4 may be stored, at least temporarily, in memory 811. Accordingly, it should be appreciated that an FPGA having sufficient programmable logic resources or dedicated processors, or a combination thereof, may be configured to provide an MPA as described herein. In effect, the FPGAaP may be used as a CPU.

A useful balance is generally sought between inter-processor communication bandwidth and computational LoR such that processor interconnect is not too significant a performance limitation. LoR may be defined as a condition where I/O at any processor block boundary is generated or consumed by an immediately adjacent processor or peripheral I/O process. Accordingly, performance may be enhanced to the degree of spatial correlation of distributed tasks to their associated processors within an MPA. Notably, there are many known, useful algorithms which may schedule tasks such that LoR for a desired performance level may be satisfied. An example may be a DSP or discrete transform algorithm existing in the form of a synchronous dataflow.

Moreover, the micro-DMA architectures described herein facilitate meeting LoR as bandwidth-sharing arbitration loss at an inter-processor micro-DMA buffer may be reduced or even eliminated. Again, it should be appreciated that a micro-DMA MPA therefore has a performance which is more closely indexed to individual processor performance characteristics and standard parallel processor physics as applied to the processor array in toto than it is to inter-processor communication delayed by arbitration.

Figure 9:
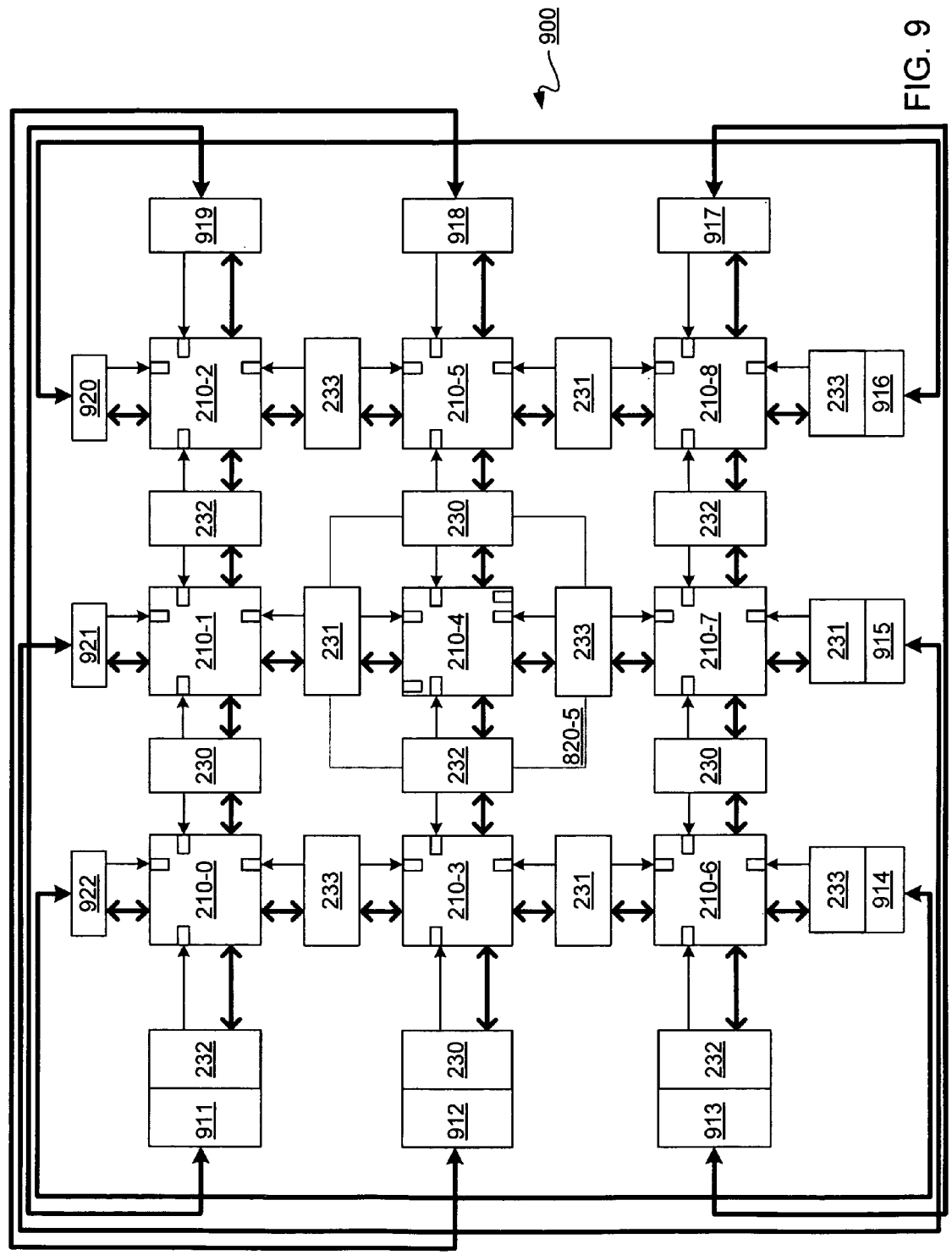
FIG. 9 is a block diagram depicting an exemplary embodiment of a Super-Computer-on-Chip ("SCoC") architecture.

FIG. 9 is a block diagram depicting an exemplary embodiment of an SCoC architecture ("SCoC") 900. SCoC 900 may be implemented in a single FPGA, such as FPGA 100 of FIG. 1. SCoC 900 includes a central processor block 210-4, which may be adapted as described above with reference to processor module 820-5 for communication with external I/O and external memory, though not shown here for purposes of clarity. Furthermore, although peripheral cores are not illustratively shown in FIG. 9, it should be appreciated that cores may be coupled to SCoC 900.

Coupled to an MPA of SCoC 900 are address translation units 911 through 922. Address translation units 911 through 916 are coupled to micro-DMAs 232, 230, 232, 233, 231, and 233, respectively. It should be appreciated that each of these micro-DMAs is associated with an address location, as previously described as basically positions 0 through 3 going around a processor block. Thus, address translation unit 911 for example provides 2-to-0 or 0-to-2 address translation, as does address translation unit 919, for coupling processor block 210-0 to processor block 210-2 via a micro-DMA block 232. Moreover, address translation units 912 and 918 provide 0-to-2 and 2-to-0 address translation for coupling processor blocks 210-3 and 210-5 via a micro-DMA block 230. Lastly, with respect to the horizontal direction as illustratively shown, address translation units 913 and 917 provide 0-to-2 and 2-to-0 address translation for communication between processor blocks 210-6 and 210-8 via a micro-DMA block 232.

In the vertical direction, the same applies; however the address translation is from 1-to-3 and 3-to-1 as provided by the various sets of address translation units. Notably, processor blocks 210-0 and 210-6 are coupled via address translation units 914 and 922, and a micro-DMA block 233. Furthermore, processor blocks 210-1 and 210-7 are coupled via address translation units 921 and 915, as well as a micro-DMA block 231. Lastly, processor blocks 210-2 and 210-8 are coupled via address translation units 916 and 920, as well as a micro-DMA block 233.

Accordingly, it should be appreciated that by coupling a right-side to a left-side and coupling a top-side with a bottom side of an MPA, effectively a toroidal processing block is provided. In this block, information may be provided to a central processor block 210-4, which information may include tasks and data, as previously described with reference to FIG. 8.

Although address translation units are illustratively shown in FIG. 9, it should be appreciated that if processor block 210-0 were cross-coupled to processor block 210-5 rather than a more directionally direct coupling to processor block 210-1, it may be that no address translation would be used. Furthermore, it should be appreciated, for example, that if processor block 210-6 were cross-coupled to processor block 210-1 rather than processor block 210-0, it may be that no address translation would be used. Thus, it should be appreciated that the right side and left side, as well as top and bottom sides, may be cross-connected and providing that the number of connections on each side is even, address translation may be avoided. Alternatively, a combination of address translation and no address translation, namely cross-connecting and no cross-connecting, may be implemented. Moreover, it may be that only top and bottom sides, or only right and left sides, of an MPA are coupled to one another to provide a tubular processor structure. Furthermore, it may be that top and right sides, or only bottom and left sides, or any combination thereof, of an MPA are coupled to one another to provide a processor structure. Thus, while examples of two-dimensional and three-dimensional mesh or array processing architectures have been described, it should be appreciated that other types of architectures that are known may be used, such as H-tree, butterfly, and pyramid architectures, among other known types of architectures.

It should be appreciated that the dynamic signature of an MPA as described herein is very different from a conventional dynamic signature of arrayed processing. Rather than multi-port expansion for having a central memory shared by multiple processors at a same time, dual-ported memories are implemented as a distributed memory. Thus, it should be appreciated that in contrast to a conventional shared memory system, the distributed shared memory system as described herein for a micro-DMA MPA architecture may have all dual-ported buffers active at the same time. Notably, the distributed memory in the micro-DMA MPA architecture is not one of a memory hierarchy, other than to the extent that a processor of an MPA may be configured as a scatter-gather server processor.

It should be noted that the use of Application Specific Modular Block ("ASMBL") FPGAs from Xilinx may be an efficient basis for a micro-DMA-based MPA implementation. It should be appreciated that the degree to which processor blocks may be tiled, and thus swapped or instantiated on a column-by-column basis, may facilitate implementation in a columnar FPGA. Furthermore, it should be appreciated that embedded processors may be considered ASMBL blocks for tiling an FPGA to provide a micro-DMA-based MPA. Notably, the columns of BRAMs of a columnar architected FPGA likewise facilitate implementation of a micro-DMA-based MPA.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. An integrated circuit, comprising:
a plurality of processing units;
a first direct memory access block, the first direct memory access block including a first dual-ported random access memory and a first decoder;
a first processing unit and a second processing unit of the plurality of processing units being topologically coupled via the first direct memory access block for providing a multiple processor array;
a first memory controller of the first processing unit being directly bused to one port of the first dual-ported random access memory and to a first processor of the first processing unit;
a first memory cache of the first processing unit coupled to the first memory controller;
a second memory controller of the second processing unit separate from the first memory controller, the second memory controller being directly bused to another port of the first dual-ported random access memory and to a second processor of the second processing unit;
a second memory cache of the second processing unit coupled to the second memory controller; and
the multiple processor array configured to use the first dual-ported random access memory for first direct buffer level access to a first shared addressable memory space of the first dual-ported random access memory as shareable between the first processing unit and the second processing unit in response to signals from the first memory controller and the second memory controller, each of the first memory controller and the second memory controller accessing the first shared addressable memory space to enable implementing a predetermined activity.

2. The integrated circuit according to claim 1, wherein the first direct memory access block includes a reserved area of the addressable memory space for status and control associated with shared use of the first direct memory access block by the first processing unit and the second processing unit.

3. The integrated circuit according to claim 2, wherein the first decoder is configured to provide event information to the first processing unit and the second processing unit for state control for the shared use of the first direct memory access block.

4. The integrated circuit according to claim 1, wherein the multiple-processor array is implemented in a single programmable logic device.

5. The integrated circuit according to claim 4, wherein the single programmable logic device comprises a columnar architected Field Programmable Gate Array having a column of dual-ported static random access memories in which the first dual-ported random access memory is included.

6. The integrated circuit according to claim 4, wherein the first processor and the second processor are respective embedded microprocessors of the single programmable logic device.

7. The integrated circuit according to claim 4, wherein the first processor and the second processor are respective microprocessors instantiated in programmable logic of the single programmable logic device.

8. The integrated circuit according to claim 4, wherein the first processor and the second processor have a same architecture as one another.

9. The integrated circuit according to claim 8, wherein the architecture is for a microprocessor, the microprocessor being a RISC processor.

10. The integrated circuit according to claim 4, wherein the first processor and the second processor have a different architecture from one another.

11. The integrated circuit according to claim 4, wherein the first processor and the second processor are respectively an embedded microprocessor and a microprocessor instantiated in programmable logic of the single programmable logic device.

12. The integrated circuit according to claim 1, wherein the second processing unit is coupled to at least one core implemented in programmable logic via a second direct memory access block, the second direct memory access block including a second dual-ported random access memory and a second decoder.

13. The integrated circuit according to claim 12, wherein the multiple-processor array is coupled to at least one device external to the integrated circuit, the multiple-processor array, and the at least one core, providing a System-on-Chip.

14. The integrated circuit according to claim 12, wherein the second direct memory access block is incorporated into the core.

15. The integrated circuit according to claim 12, wherein the first processing unit comprises a scatter-gather microprocessor for the plurality of processing units, the scatter-gather microprocessor being coupled to an input/output device via a third direct memory access block and further being coupled to a system memory via a fourth direct memory access block, the multiple-processor array being a central processing unit.

16. The integrated circuit according to claim 15, wherein the third direct memory access block and the fourth direct memory access block are respectively incorporated into the input/output device and the system memory, both of which are external to the integrated circuit; and wherein the integrated circuit comprises a Field Programmable Gate Array.

17. The integrated circuit according to claim 12, wherein the multiple-processor array includes busing coupling remote interfaces of the plurality of processing units one to another via respective direct memory access blocks for providing a Super-Computer-on-Chip.

18. The integrated circuit according to claim 17, wherein the integrated circuit comprises a Field Programmable Gate Array.

19. The integrated circuit according to claim 1, further comprising:
a second direct memory access block;
the second direct memory access block including a second dual-ported random access memory and a second decoder; and
a third processing unit of the plurality of processing units topologically coupled via the second direct memory access block to the second processing unit;
a third memory controller of the third processing unit being directly bused to one port of the second dual-ported random access memory;
the second memory controller of the second processing unit being directly bused to another port of the second dual-ported random access memory; and the multiple processor array configured to use the second dual-ported random access memory for second direct buffer level access to a second shared addressable memory space of the second dual-ported random access memory as shareable between the third processing unit and the second processing unit.

20. The integrated circuit according to claim 1, wherein:

the first decoder is configured to send an event vector to the second processing unit responsive to the first processing unit accessing the first shared addressable memory space; and the first decoder is further configured to send the event vector to the first processing unit responsive to the second processing unit accessing the first shared addressable memory space.

* * * * *